(12) United States Patent
Tsuruma

(10) Patent No.: US 10,886,744 B2
(45) Date of Patent: Jan. 5, 2021

(54) POWER CONVERSION SYSTEM, POWER SUPPLY SYSTEM AND POWER CONVERSION DEVICE

(71) Applicant: TOSHIBA MITSUBISHI-ELECTRIC INDUSTRIAL SYSTEMS CORPORATION, Chuo-ku (JP)

(72) Inventor: Yoshinori Tsuruma, Chuo (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 150 days.

(21) Appl. No.: 16/324,618

(22) PCT Filed: Oct. 14, 2016

(86) PCT No.: PCT/JP2016/080543
§ 371 (c)(1),
(2) Date: Feb. 11, 2019

(87) PCT Pub. No.: WO2018/070037
PCT Pub. Date: Apr. 19, 2018

(65) Prior Publication Data
US 2019/0173284 A1 Jun. 6, 2019

(51) Int. Cl.
*H02J 3/32* (2006.01)
*H02J 7/35* (2006.01)
(Continued)

(52) U.S. Cl.
CPC .............. *H02J 3/32* (2013.01); *H02J 3/38* (2013.01); *H02J 3/383* (2013.01); *H02J 7/35* (2013.01); *H02M 7/48* (2013.01)

(58) Field of Classification Search
CPC ........ H02J 3/32; H02J 3/38; H02J 7/35; H02J 3/383; H02J 3/381; H02J 2300/24; H02M 7/48; Y02E 10/56
See application file for complete search history.

(56) References Cited

U.S. PATENT DOCUMENTS

2005/0006958 A1  1/2005  Dubovsky
2015/0001932 A1  1/2015  Inoue et al.

FOREIGN PATENT DOCUMENTS

CN  205565750 U     9/2016
JP  2002-171674 A   6/2002
(Continued)

OTHER PUBLICATIONS

Partial Extended European Search Report dated Dec. 11, 2019, in Patent Application No. 16918785.3, 4 pages.
(Continued)

*Primary Examiner* — Daniel J Cavallari
(74) *Attorney, Agent, or Firm* — Oblon, McClelland, Maier & Neustadt, L.L.P.

(57) ABSTRACT

Embodiments provide a power conversion system, a power supply system, and a power conversion device which can use effectively the generated power of the DC generator and the power charged into the power storage device. The power conversion system of the embodiments includes a first power conversion device, a second power conversion device, a third power conversion device, and a control device. The first power conversion device is connected between a DC generator and an electric power system. The second power conversion device is connected between a power storage device and the electric power system. The third power conversion device is connected between the DC generator and the power storage device. The control device sets operations of the first power conversion device, the second power conversion device and the third power conversion device on the basis of a DC power which the DC generator outputs and a DC power which is set.

8 Claims, 7 Drawing Sheets

(51) Int. Cl.
*H02J 3/38* (2006.01)
*H02M 7/48* (2007.01)

(56) References Cited

FOREIGN PATENT DOCUMENTS

| JP | 2012010531 | A | * | 1/2012 | |
|----|------------|---|---|--------|--|
| JP | 2016123171 | A | * | 7/2016 | |
| WO | WO-2010038666 | A1 | * | 4/2010 | .............. H02J 3/382 |

OTHER PUBLICATIONS

International Search Report dated Dec. 27, 2016 in PCT/JP2016/080543 filed Oct. 14, 2016.

* cited by examiner

POWER CONVERSION SYSTEM, POWER SUPPLY SYSTEM AND POWER CONVERSION DEVICE

TECHNICAL FIELD

Embodiments of the invention relate to a power conversion system, a power supply system and a power conversion device.

BACKGROUND ART

There is a power supply system combining a DC generator such as a solar cell panel with a power storage device such as a storage battery. In such a power supply system, a power conversion device is connected to a DC generator, converts a DC power to an AC power and supplies the AC power to an electric power system or the like. A power conversion system is connected to the power storage device, converts the DC power to the AC power to supply the power to the electric power system, and converts the AC power to the DC power to charge the power storage device. In such a power conversion device, it is desired that a generated power of the DC generator and the power charged into the power storage device can be used effectively.

PRIOR ART DOCUMENT

Patent Literature

[Patent Literature 1]
JP 2002-171674 A (Kokai)

SUMMARY OF INVENTION

Problem to be Solved by Invention

The embodiments of the invention provide a power conversion system, a power supply system, and a power conversion device which can use effectively the generated power of the DC generator and the power charged into the power storage device.

Means for Solving the Problem

According to one embodiment of the invention, a power conversion system includes a first power conversion device connected between a DC generator and an electric power system, the DC generator outputting a DC power, the first power conversion device converting at least a portion of the DC power to an AC power to supply to the electric power system, a second power conversion device connected between a power storage device and the electric power system, the power storage device being possible to charge and discharge, the second power conversion device supplying a power from the power storage device to the electric power system, the second power conversion device supplying a power from the electric power system to the power storage device, a third power conversion device connected between the DC generator and the power storage device, the third power conversion device supplying a power for charging the power storage device, and a control device setting operations of the first power conversion device, the second power conversion device and the third power conversion device based on a first data and a second data, the first data being a data of the DC power, the second data being a data of a set DC power. The control device, when the first data is larger than the second data or is equal to the second data, transmits a first command to the first power conversion device, the first command setting an AC power which the first power conversion device outputs based on the second data, and transmits a second command to the third power conversion device, the second command setting a power which the third power conversion device charges the power storage device based on a difference between the first data and the second data. The control device, when the first data is smaller than the second data, transmits a third command to the first power conversion device, the third command setting an AC power which the first power conversion device outputs based on the first data, and transmits a fourth command to the second power conversion device, the fourth command setting an AC power which the second power conversion device outputs based on a difference between the second data and the first data.

Effect of Invention

According to the embodiments of the invention, a power conversion system, a power supply system, and a power conversion device which can use effectively the generated power of the DC generator and the power charged into the power storage device can be provided.

DESCRIPTION OF EMBODIMENTS

Figure 1:
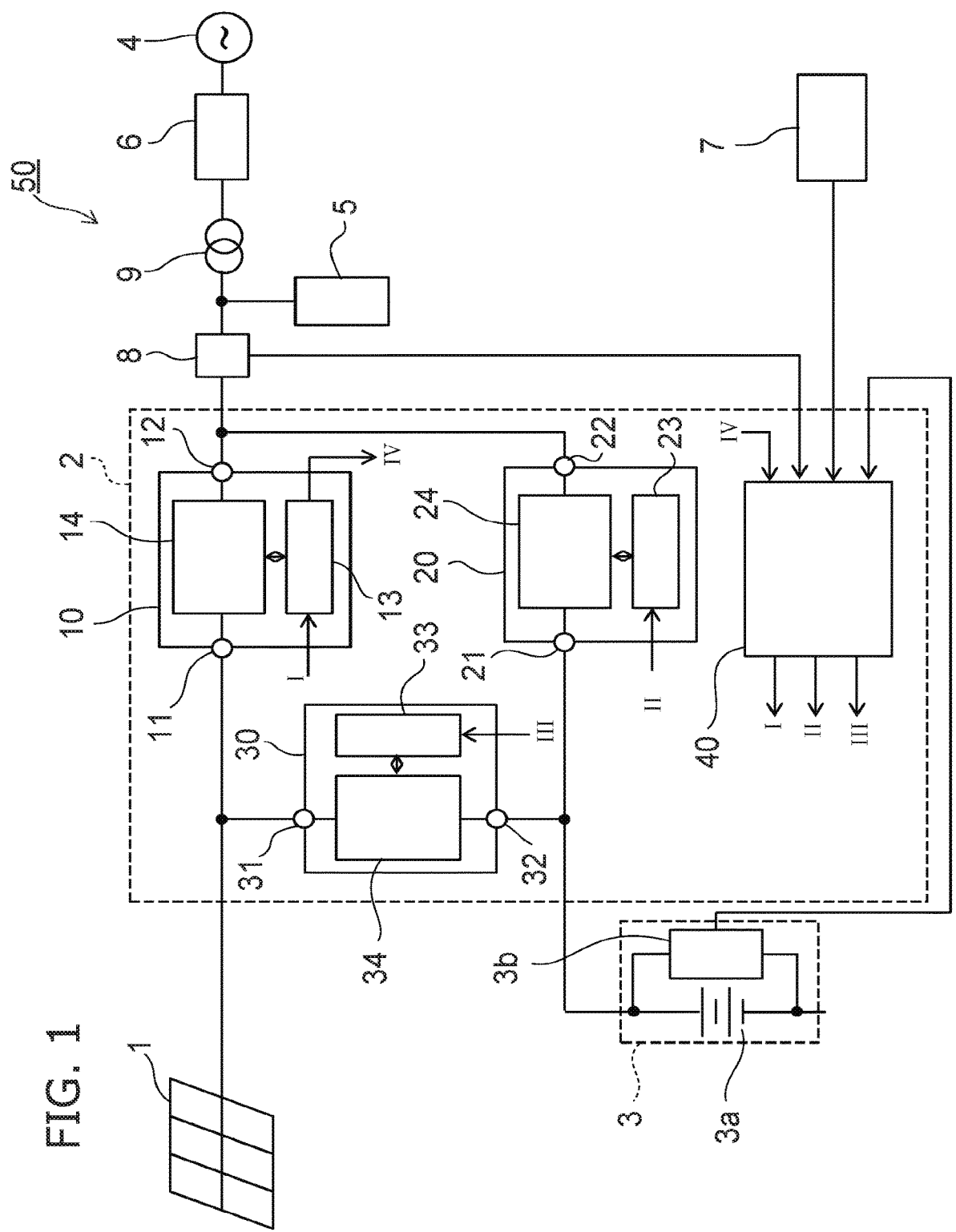
FIG. 1 is a block diagram illustrating a power supply system and a power conversion system according to a first embodiment.

Embodiments of the invention will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

First Embodiment

FIG. 1 is a block diagram illustrating a power supply system and a power conversion system according to the embodiment.

The configurations of a power supply system 50 and a power conversion system 2 of the embodiment will be described.

As shown in FIG. 1, the power supply system 50 includes a DC generator 1 and the power conversion system 2, and a power storage device 3.

The power conversion system 2 converts a DC power generated by the DC generator 1 to an AC power, and supplies to at least one of an electric power system 4 or a load 5. The DC generator 1 may output the DC power irrespective of the magnitude of the power consumption demanded by the electric power system 4 or the load 5.

In the case where the magnitude of the DC power generated by the DC generator 1 is not less than the magnitude of a planned value of the generated power supplied to the electric power system 4 or the load 5, the power conversion system 2 charges surplus power to the power storage device 3. In the case where the magnitude generated by the DC generator 1 is smaller than the planned value of the generated power supplied to the electric power system 4 or the load 5, the power conversion system 2 supplies a lack power to the electric power system 4 or the load 5 from the power storage device 3. The power supply system 50 can supply the leveled power to the electric power system 4 and the load 5.

In the case where the power is not supplied from the DC generator 1 and the electric power system 4, the power supply system 50 can supply the AC power from the power storage device 3 to the load 5.

The DC generator 1 is connected to the power conversion system 2. The DC generator 1 generates the DC power, and supplies the generated DC power to the power conversion system 2. The DC generator 1 is, for example, a solar cell panel. The DC generator 1 is sufficiently to be a distributed power supply which is possible to supply the DC power to the power conversion system 2.

The power conversion system 2 includes a first power conversion device 10, a second power conversion device 20, a third power conversion device 30, and a control device 40.

The first power conversion device 10 is connected to the DC generator 1, the electric power system 4, the load 5 and the control device 40. The second power conversion device 20 is connected to the power storage device 3, the electric power system 4, the load 5 and the control device 40. The third power conversion device 30 is connected to the DC generator 1, the power storage device 3 and the control device 40. Here, "connection" includes being connected detachably by using a connector or the like and fixing a terminal by a bolt or the like. In the case of "connecting", it is not limited to an electrical connection by a cable or the like but also a state in which wired or wireless transmission and reception of a signal can be made via a communication line.

The first power conversion device 10 includes a first DC terminal 11, a first AC terminal 12, a first control part 13, and a first power conversion part 14. The first power conversion part 14 is connected to the DC generator 1 via the first DC terminal 11. The first power conversion part 14 is connected to the electric power system 4 and the load 5 via the first AC terminal 12. The first power conversion part 14 is connected to the first control part 13. The first control part 13 detects an input voltage and current, and for example, controls the DC generator 1 to output a maximum power. The first control part 13 detects an outputting voltage and line current, and generates a control signal for controlling the first power conversion part 14. The first power conversion part 14 operates in accordance with the control signal generated by the first control part 13. In the case where the input voltage, the input current, the output voltage or the output current is excessively large or excessively small, the first control part 13 protects the first power conversion part 14 by stopping the first power conversion part 14 or the like.

Figure 2A:
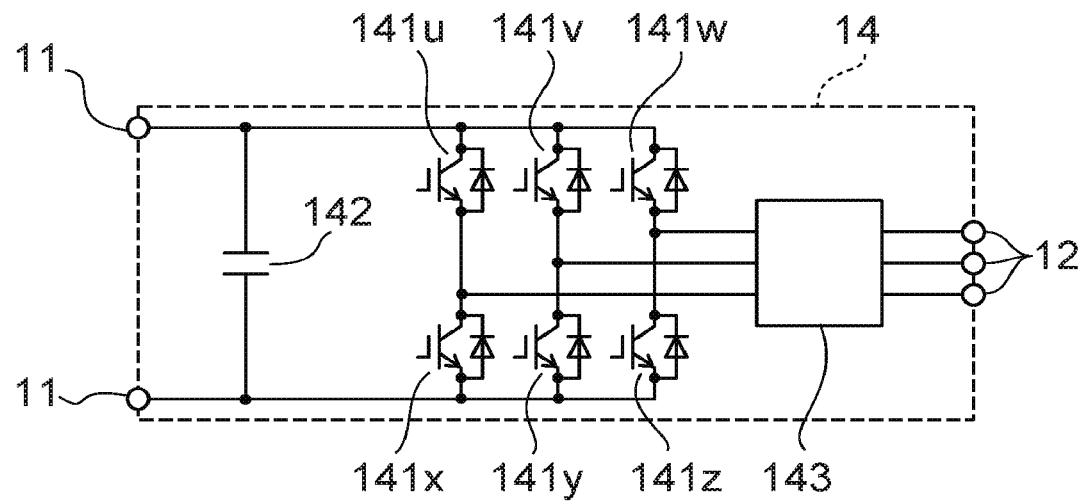
FIG. 2A is a circuit diagram illustrating a portion of a first power conversion device.

The first power conversion part 14 can be based on, for example, a self-commutated conversion circuit. As shown in FIG. 2A, the first power conversion part 14 can be based on, for example, a three-phase bridge circuit. Each arm of the three-phase bridge circuit can be based on, for example, self-extinguishing type switching elements 141u to 141z. The switching elements are, for example, IGBT (Insulated Gate Bipolar Transistor) and MOSFET (Metal Oxide Semiconductor Field Effect Transistor) or the like. A capacitor 142 is connected between the first DC terminals 11. The capacitor 142 smooths the input current of the first power conversion part and suppresses voltage variation between the first DC terminals 11. A filter 143 is connected between a connection node of each arm of the switching elements 141u to 141z and the first AC terminal 12. The filter 143 removes a harmonics generated by switching.

The description will be continued by returning to FIG. 1. The first control part 13 is connected to the control device 40. The first control part 13 transmits data or the like of the voltage and the current input to the first power conversion part 14 to the control device 40 (IV). The first control part 13 receives the command from the control device 40 (I).

The second power conversion device 20 includes a second DC terminal 21, a second AC terminal 22, a second control part 23, and a second power conversion part 24. The second DC terminal 21 is connected to the power storage device 3, and connected to the third power conversion device 30. The second AC terminal 22 is connected to the first AC terminal 12, the electric power system 4 and the load 5. The second control part 23 responses to the command from the control device 40, controls output power of the second power conversion device 20, and protects the second power conversion device 20. The second power conversion device 20 is a bi-directional AC-DC power conversion device which converts the DC power to the AC power and converts the AC power to the DC power. The second power conversion device 20 performs discharge from the power storage device 3 and charge to the power storage device 3.

The second power conversion device 20 can be based on the self-commutated conversion circuit as well as the first power conversion device 10. The conversion circuit of the second power conversion device 20 may be based on the same circuit as the first power conversion device 10 and may be based on a different circuit. The first power conversion device 10 and the second power conversion device 20 may be based on other power conversion circuit without limitation to the three-phase bridge circuit described above. The conversion circuit can be based on, for example, a multilevel power conversion circuit and its derived circuit or the like.

The second control part 23 is connected to the control device 40. The second control part 23 receives the command from the control device 40 (II).

The AC power which the first power conversion device 10 and the second power conversion device 20 convert may be single phase AC and three phase AC.

The third power conversion device 30 includes a third DC terminal 31, a fourth DC terminal 32, a third control part 33, and a third power conversion part 34. The third power conversion part 34 is connected to the DC generator 1 and the first power conversion device 10 via the third DC terminal 31. The third power conversion part 34 is connected to the second DC terminal 21 of the power storage device 3 and the second power conversion device 20 via the fourth DC terminal 32. The third control part 33 responds to the command from the control device 40, controls the output power of the third power conversion part 34, and protects the third power conversion device 30. The third power conversion device 30 converts the DC voltage output from the DC generator 1 to a different DC voltage or DC current and supplies to the power storage device 3. The third power conversion device 30 includes, for example, a non-insulated type DC-DC converter circuit.

Figure 2B:
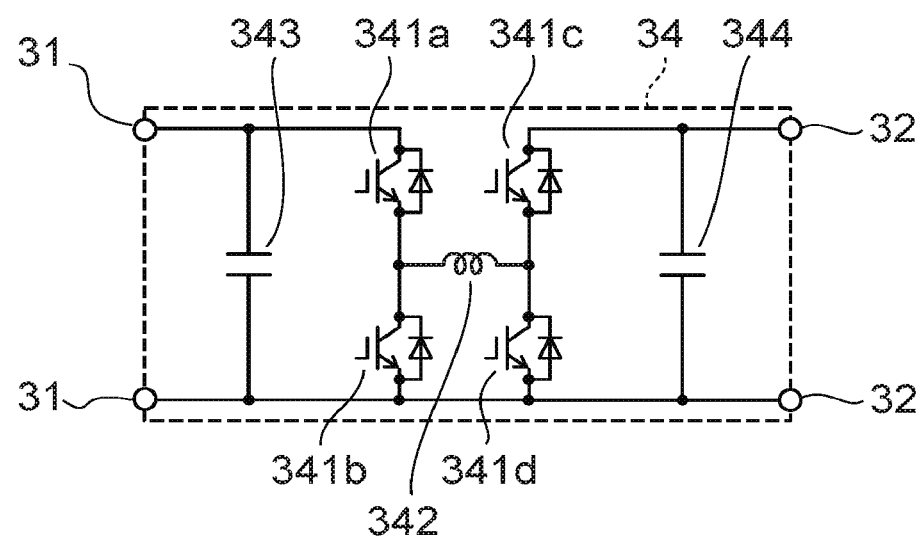
FIG. 2B is a circuit diagram illustrating a portion of a third power conversion part.

As shown in FIG. 2B, the third power conversion part 34 includes a buck-boost type DC-DC converter circuit in this example. Switching elements 341a, 341b are connected in series between a high potential side and a low potential side of the third DC terminal 31. Switching elements 341c, 341d are connected in series between a high potential side and a low potential side of the fourth DC terminal 32. An inductor 342 is connected between a connection node of the switching elements 341a, 341b and a connection node of the switching elements 341c, 341d. A capacitor 343 is connected between the high potential side and the low potential side of the third DC terminal 31. A capacitor 344 is connected between the high potential side and the low potential side of the fourth DC terminal 32.

In the case where a value of the DC voltage input from the third DC terminal 31 is higher than a value of the DC voltage output from the fourth DC terminal 32, the third power conversion part 34 steps down. In the case where the value of the DC voltage input from the third DC terminal 31 is lower than the value of the DC voltage output from the fourth DC terminal 32, the third power conversion part 34 boosts.

An adequate circuit type is selected for a conversion circuit of the third power conversion device 30 depending on an output voltage of the DC generator and a voltage of the power storage device at charging. The conversion circuit of the third power conversion device 30 may be either a boost type or a buck type or the like. The conversion circuit may be a step-up and step-down circuit including a transformer.

The third control part 33 is connected to the control device 40. The control part 33 receives the command from the control device 40.

Although not shown, the first control part 13, the second control part 23 and the third control part 33 are connected one another, and are possible of exchanging data. The second control part 23 and the third control part 33 may directly transmit the data of voltage or the like to the control device 40.

The control device 40 is connected to the first control part 13, the second control part 23, the third control part 33, an output power detection part 8 and the power storage device 3. In this example, the control device 40 is also connected to a host controller 7. The control device 40 controls operations of the power supply system 50 and the power conversion system 2 by transmitting and receiving the data with the first control part 13, the second control part 23, the third control part 33, the output power detection part 8, the power storage device 3 and the host controller 7.

Sharing of functions of the control device 40, the first control part 13, the second control part 23 and the third control part 33 is not limited to the above. The control device 40 may include some or all of the respective functions of the first control part 13, the second control part 23 and the third control part 33. For example, the functions of the first control part 13 and the second control part 23 may be included in the first power conversion device 10 and the second power conversion device 20 respectively as described above and the function of the third control part 33 may be included in the control device 40. For example, some of the function of the third control part 33 may be included in the control device 40 or the like.

The power storage device 3 includes a storage battery 3a, and a storage battery management part 3b. The storage battery 3a realizes a desired storage capacity, for example, since unit cells such as a lead battery, lithium ion battery or the like are connected in series and connection bodies connected in series are connected in parallel. The storage battery management part 3b monitors a charging amount of the storage battery 3a, performs charge control depending on a type of the storage battery 3a, and performs discharge control on the basis of the charging amount. The storage battery management part 3b is connected to the second power conversion device 20 and the third power conversion device 30 via the control device 40. The storage battery management part 3b can transmit and receive the data about the charging amount of the storage battery 3a to the second power conversion device 20 and the third power conversion device 30.

The electric power system 4 is, for example, a power line of commercial power supply, and the power supplied by the electric power system 4 is AC. The AC voltage of the electric power system 4 is, for example, 6600 V (effective value). A frequency of the AC power of the electric power system 4 is, for example, 50 Hz or 60 Hz. The electric power system 4 may be, for example, the power line or the like in a non-utility power generation system.

The first power conversion device 10 and the second power conversion device 20 are connected to the electric power system 4 via a circuit breaker 6. The circuit breaker 6 has an input state connecting the first power conversion device 10 and the electric power system 4 and connecting the second power conversion device 20 and the electric power system 4, and an open state separating the first power conversion device 10 and the second power conversion device 20 from the electric power system 4. The input and opening of the circuit breaker 6 is controlled, for example, by an administrator of the electric power system 4.

The load 5 is connected between the power conversion system 2 and the electric power system 4. As in this example, the load 5 may be connected to the electric power system 4 via a transformer 9. The load 5 is an AC load. A rated power of the load 5 corresponds to the AC power of the electric power system 4. The load 5 is, for example, electronics. The load 5 is connected between each of the first power conversion device 10 and the second power conversion device 20 and the circuit breaker 6 via a switchboard and a distribution board or the like. In the case where the circuit breaker 6 is in the open state due to a system accident or the like, and the electric power system 4 and the load 5 are separated, the power supply system 50 transitions in an independent operation mode. In this case, the load 5 receives supply of the power from the DC generator 1 and the power storage device 3.

The host controller 7 manages the operation or the like of the power supply system 50. For example, it controls the startup and the shutdown of the power supply system 50. The host controller 7 supplies, for example, a planned value of the generated power corresponding to a planned power demand to the power supply system 50. For example, the planned value of the generated power is set on the basis of the previous day power demand or the like, and the output power is set depending on the power demand per time zone.

The output power detection part 8 is provided between the output of the power conversion system 2 and the electric power system 4. The output power detection part 8 detects the voltage and the current which the power conversion system 2 outputs, and transmits the data of the detected voltage and current to the control device 40. The control device 40 calculates the power which the power supply system 50 and the power conversion system 2 output on the basis of the data of the received voltage and current. The output power detection part 8 may calculate the power on the basis of the data of the detected voltage and current, and may transmit the calculated output power to the control device 40.

In the embodiment, the third power conversion device 30 directly charges the DC power output from the DC generator 1 to the power storage device 3 without via other power conversion circuits. For that reason, a power loss at charging due to the third power conversion device 30 can be suppressed. Therefore, the power supply system 50 can use effectively the generated power of the DC generator 1.

In the case where the power is supplied to at least one of the electric power system 4 and the load 5 from the power storage device 3, the second power conversion device 20 directly supplies the AC power from the power storage device 3 without via other power conversion circuits. Therefore, the power supply system 50 can use effectively the charged power to the power storage device 3.

The operations of the power supply system 50 and the power conversion system 2 of the embodiment will be described.

In the case where the generate power of the DC generator 1 is supplied to the electric power system 4 and the load 5, the first power conversion device 10 converts the DC power output from the DC generator 1 to the AC power on the basis of the command from the control device 40. The first power conversion device 10 supplies the converted AC power to the electric power system 4 and the load 5.

In the case where the power storage device 3 is charged by the generated power of the DC generator 1, the power is transmitted in order of the DC generator 1, the third power conversion device 30, and the power storage device 3.

Specifically, the third power conversion device 30 steps down or boosts the voltage of the DC power output from the DC generator 1 to supply to the power storage device 3 on the basis of the command from the control device 40.

In the case where a remaining charge of the storage battery 3a is sufficiently large, the control device 40 transmits the command to the third control part 33 not so as to charge to the power storage device 3. For example, in the case where the remaining charge is not less than 80% of full charge, the charge is stopped.

In the case where the DC power of the power storage device 3 is supplied to at least one of the electric power system 4 and the load 5, the power is converted in order of the power storage device 3, the second power conversion device 20, the electric power system 4 and the load 5. Specifically, the second power conversion device 20 converts the DC power output from the power storage device 3 to the AC power to supply to the electric power system 4 and the load 5 by the command from the control device 40.

In the case where the remaining charge of the storage battery 3a is extremely small, the control device 40 transmits the command to the second control part 23 so as not to discharge from the power storage device 3. For example, when the remaining charge is less than 20%, the discharge is stopped.

In the case where the power of the electric power system 4 is charged to the power storage device 3, the power is transmitted in order of the electric power system 4, the second power conversion device 20 and the power storage device 3. The second power conversion device 20 converts the AC power supplied from the electric power system 4 to the DC power to output to the power storage device 3 by the command from the control device 40.

In the case where the remaining charge of the storage battery 3a is sufficiently large, the control device 40 transmits the command to the second control part 23 so as not to charge to the power storage device 3. For example, when the remaining charge is not less than 80% of the full charge, the charge is stopped.

The control device 40 can acquire the data of the current and the voltage output from the DC generator 1 via the first control part 13, for example. The control device 40 calculates the generated power which the DC generator 1 outputs on the basis of the acquired data of the voltage and the current. The control device 40 determines whether the calculated generated power is not less than the planned value of the generated power set in advance or not. The control device 40 determines via the storage battery management part 3b whether it is not less than the predetermined value determined on the basis of the remaining amount of the power storage device 3. The control device 40 transmits the command about the operation depending on the determination result to each of the first power conversion device 10, the second power conversion device 20 and the third power conversion device 30.

Figure 3:
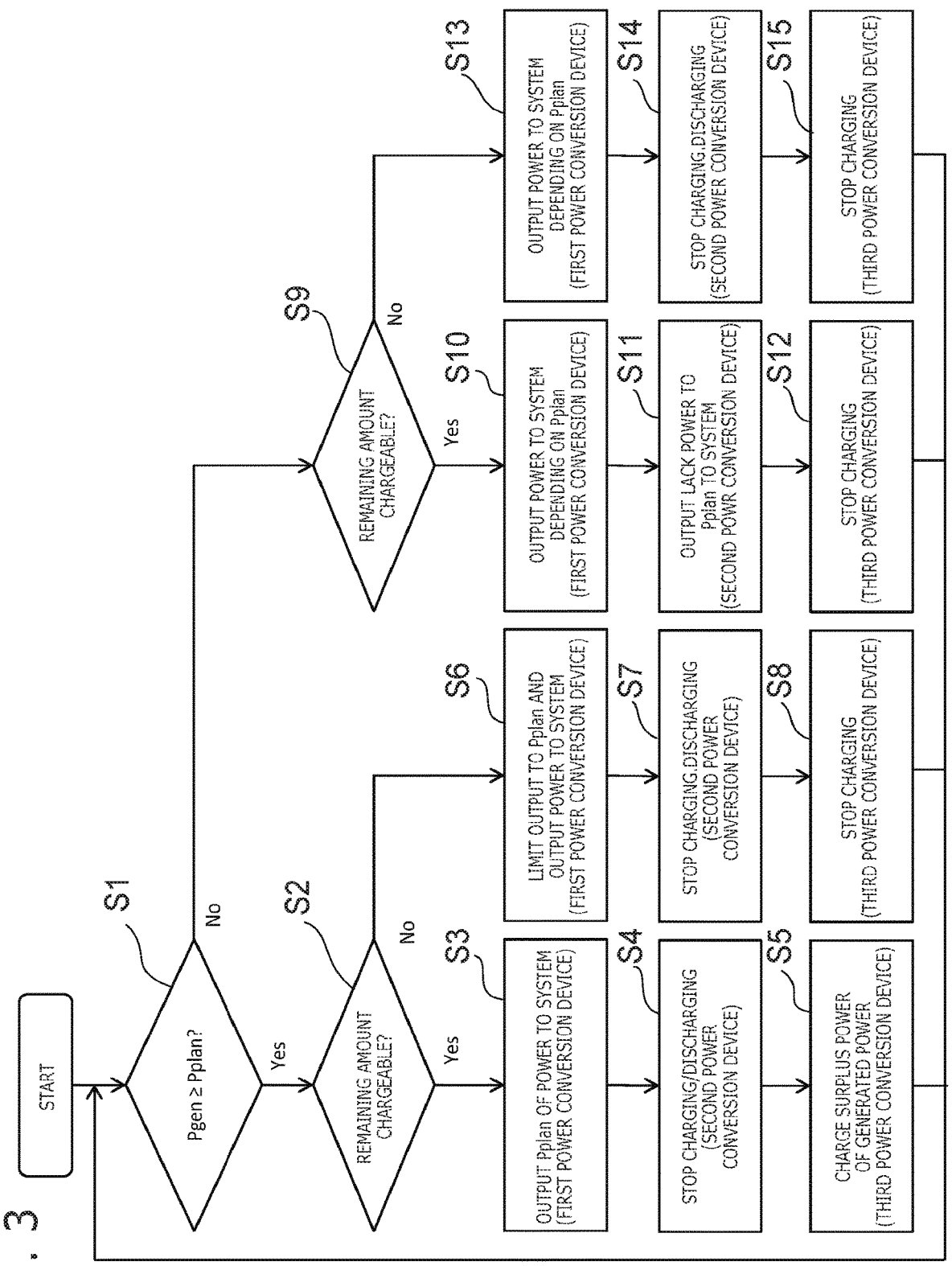
FIG. 3 is an example of a flow chart for describing operations of the power supply system and the power conversion system according to the first embodiment.

FIG. 3 is an example of a flow chart for describing the operation of the power supply system and the power conversion device according to the embodiment.

The series of operation of the power conversion system 2 of the embodiment will be described by using the flow chart in FIG. 3. The detailed description of charging from the electric power system 4 to the power storage device 3 by the second power conversion device 20 is omitted because of overlapping the above description.

In the step S1, the control device 40 determines whether a generated power Pgen output from the DC generator 1 is not less than a planned value Pplan of the preset generated power or not. In the case where the generated power Pgen is determined to be not less than the planned value Pplan, the control device 40 transitions the processing to the next step S2. In the case where the generated power Pgen is determined to be smaller than the planned value Pplan, the control device 40 transitions the processing to the step S9.

In the step S2, the control device 40 determines whether the remaining amount of the power storage device 3 is chargeable or not. The chargeable remaining amount is set in advance, for example, like 80% of the full charge. For example, the preset threshold value SOCth1 is 80% of the full charge. The control device 40 may have the threshold value SOCth1. The storage battery management part 3b may have the threshold value SOCth1, and the storage battery management part 3b may transmit a flag of being chargeable to the control device 40. In the case where the remaining amount of the power storage device 3 is determined to be chargeable, the control device 40 transitions the processing to the step S3. In the case where the remaining amount of the power storage device 3 is determined to be not chargeable, the control device 40 transitions the processing to the step S6.

In the step S3, the control device 40 commands the first control part 13 so that the first power conversion device 10 outputs the planned value Pplan of the generated power with.

In the step S4, the control device 40 commands to the second control part 23 so that the second power conversion device 20 does neither charge nor discharge.

In the step S5, the control device 40 commands the third control part 33 so that the third conversion device 30 charges the surplus power with respect to the planned value Pplan of the generated power Pgen to the power storage device 3. This surplus power is generally equal to a difference between the generated power Pgen and the planned value Pplan.

In the case where the power storage device 3 is determined to be not chargeable in the step S2, in the step S6, the control device 40 commands the first control part 13 so that the first power conversion device 10 outputs the planned value Pplan. In this case, because the generated power Pgen is larger than the planned value Pplan, it is set that the first control part 13 limits the output current value depending on the planned value Pplan. Alternatively, the outputting effective power may be set by adjusting a phase of the output current depending on the planned value Pplan.

In the step S7, the control device 40 commands the second control part 23 so that the second power conversion device 20 does neither charge nor discharge.

In the step S8, the control device 40 commands the third control part 33 so that the third power conversion device 20 does not perform the charge operation.

In the case where the generated power Pgen is determined to be smaller than the planned value Pplan, in the step S9, the control device 40 determines whether the power storage device 3 has the dischargeable remaining amount or not via the storage battery management part 3b. The dischargeable remaining amount is preset, for example, like 20% of the full charge. The preset threshold value SOCth12 is, for example, 20% of the full charge. The control device 40 determines whether the power storage device 3 is dischargeable or not on the basis of the data showing the remaining amount received from the storage battery management part 3b. Alternatively, the control device 40 may determine by a flag of being chargeable transmitted from the storage battery management part 3b. In the case where the power storage device 3 has the chargeable remaining amount, the control device 40 transitions the processing to the step S10. In the case where the power storage device 3 has not the chargeable remaining amount, the control device 40 transitions the processing to the step S13.

In the step S10, the control device 40 commands the first control part 13 so that the first power conversion device 10 converts all of the generated power Pgen to the AC power to output.

In the step S11, the control device 40 commands the second control part 23 so that the second power conversion device 20 converts a lack power with respect to the planned value Pplan to the AC power to output from the power storage device 3 to the electric power system.

In the step S12, the control device 40 commands the third control part 33 so that the third power conversion device 30 does not perform the charge operation.

In the case where the power storage device 3 is determined not to have the dischargeable remaining amount, in the step S13, the control device 40 commands the first control part 13 so that the first power conversion device 10 converts all of the supplied generated power Pgen to the AC power to output.

In the step S14, the control device 40 commands the second control part 23 so that the second power conversion device 20 does not perform the charge and discharge operations.

In the step S15, the control device 40 commands the third control part 33 so that the third power conversion device 30 does not perform the charge operation.

Effects of the power supply system and the power conversion system of the embodiment will be described while comparing with a power supply system of a comparative example.

Figure 4A:
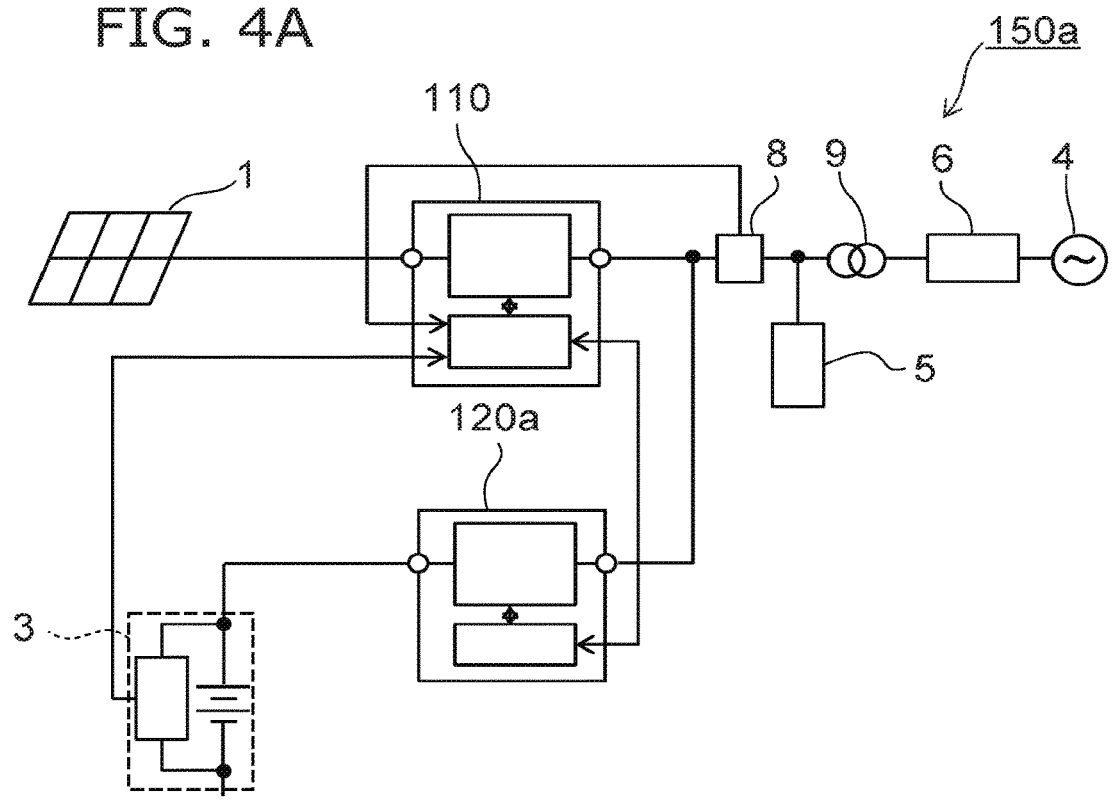
FIG. 4A and FIG. 4B are block diagrams illustrating a power supply system of a comparative example.
Figure 4B:
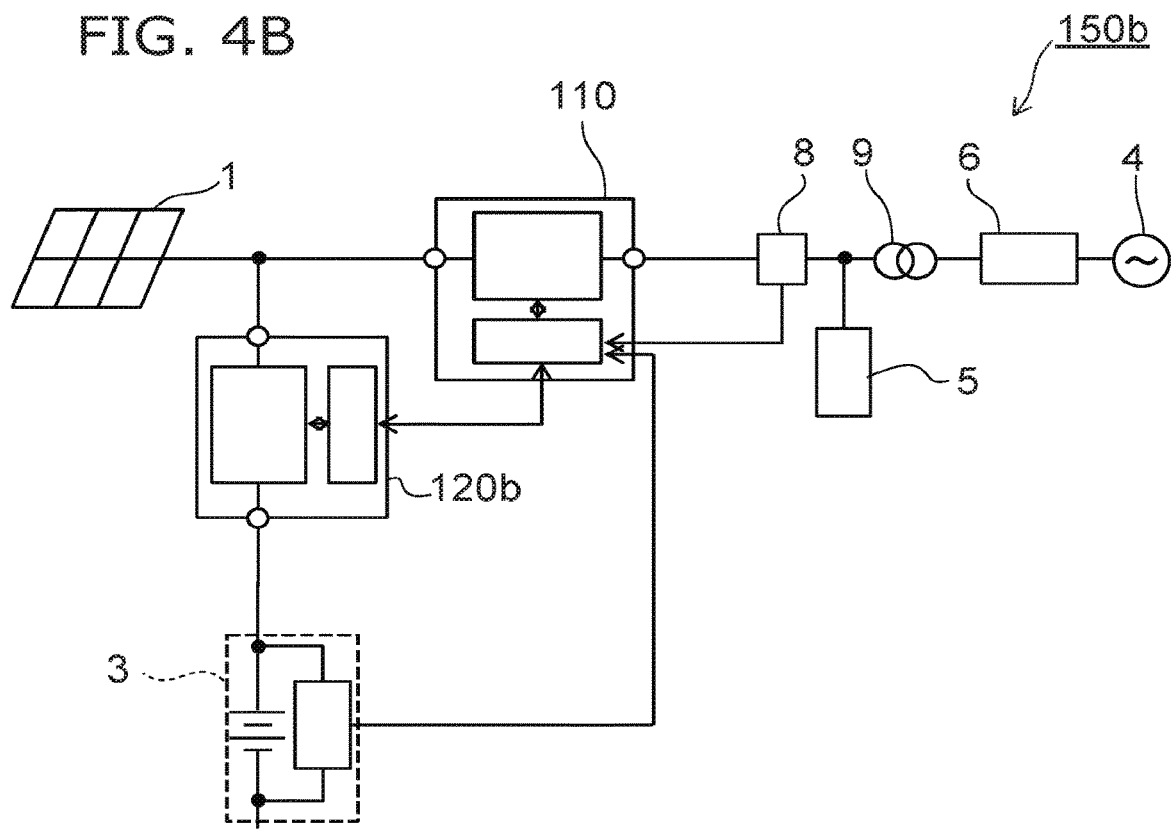

FIG. 4A and FIG. 4B are block diagrams illustrating the power supply system of the comparative example.

As shown in FIG. 4A, in a power supply system 150a of the comparative example, a first power conversion device 110 is connected between the DC generator 1 and the electric power system 4. The first power conversion device 110 inputs the DC power generated in the DC generator 1 and converts to the AC power to supply to the electric power system 4.

In the power supply system 150a of the comparative example, a second power conversion device 120a is connected between the power storage device 3 and the electric power system 4. The second power conversion device 120a is a bi-directional inverter. In the case where the AC power which the first power conversion device 110 supplies is smaller than the AC power which the electric power system 4 requires, the second power conversion device 120a inputs the DC power of the power storage device 3, and converts to the AC power to output.

In the case where the AC power which the first power conversion device 110 outputs is larger than the AC power which the electric power system 4 requires, the second power conversion device 120a inputs the AC power that the AC power which the electric power system 4 requires is subtracted from the AC power which the first power conversion device 110 outputs. The second power conversion device 120a converts the AC power of the difference, and charges the power storage device 3.

In the power supply system 150a of the comparative example, in the case where the power storage device 3 is charged from the DC generator 1 as described above, the power for charging is supplied to the power storage device 3 via the first power conversion device 110 and the second power conversion device 120a which are cascaded. For that reason, a portion of the generated power output from the DC generator 1 is losses of the first power conversion device 110 and the second power conversion device 120a, and the efficiency of charging to the power storage device 3 is lowered.

As shown in FIG. 4B, in a power supply system 150b of other comparative example, a second power conversion device 120b is connected between the DC generator 1 and the power storage device 3. The second power conversion device 120b is a bi-directional DC-DC converter.

In the case where the magnitude of the DC power which the DC generator outputs is smaller than the magnitude of the AC power which the electric power system 4 requires, the second power conversion device 120b inputs the DC power of the power storage device 3, and supplies to the first power conversion device 110. The first power conversion device 110 converts the DC power supplied from the DC generator 1 and the second power conversion device 120b to the AC power, and supplies to the electric power system 4.

In the case where the magnitude of the DC power which the DC generator outputs is larger than the magnitude of the AC power which the electric power system 4 requires, the second power conversion device 120b inputs the power that the magnitude of the power which the electric power system 4 requires is subtracted from the magnitude of the DC power which the DC generator 1 outputs. The second power conversion device 120b converts the power of the difference to the DC power depending on the storage battery, and charges the power storage device 3.

In the power supply system 150b of the comparative example, in the case where the discharge is made from the power storage device 3 to the electric power system 4 as described above, the discharge power is supplied to the electric power system 4 via the second power conversion device 120b and the first power conversion device 110 which are cascaded. For that reason, a portion of the power supplied from the power storage device 3 is losses of the first power conversion device 110 and the second power conversion device 120b, and the usage efficiency of the power storage device 3 is lowered.

On the contrary, according to the power supply system 50 and the power conversion system 2 of the embodiment, because the DC power output from the DC generator 1 is charged to the power storage device 3 via the third power conversion device 30, a loss of only one level of the converter is generated. Even if the power is supplied from the power storage device 3 to the electric power system 4, the discharge is made via the second power conversion device 20, and thus the loss of only one level of the converter is just generated. For this reason, in the power supply system 50 and the power conversion system 2 of the embodiment, it is possible to make effective use of the generated power of the DC generator 1, and the charging amount of the power storage device 3 can be effectively used.

Second Embodiment

Figure 5:
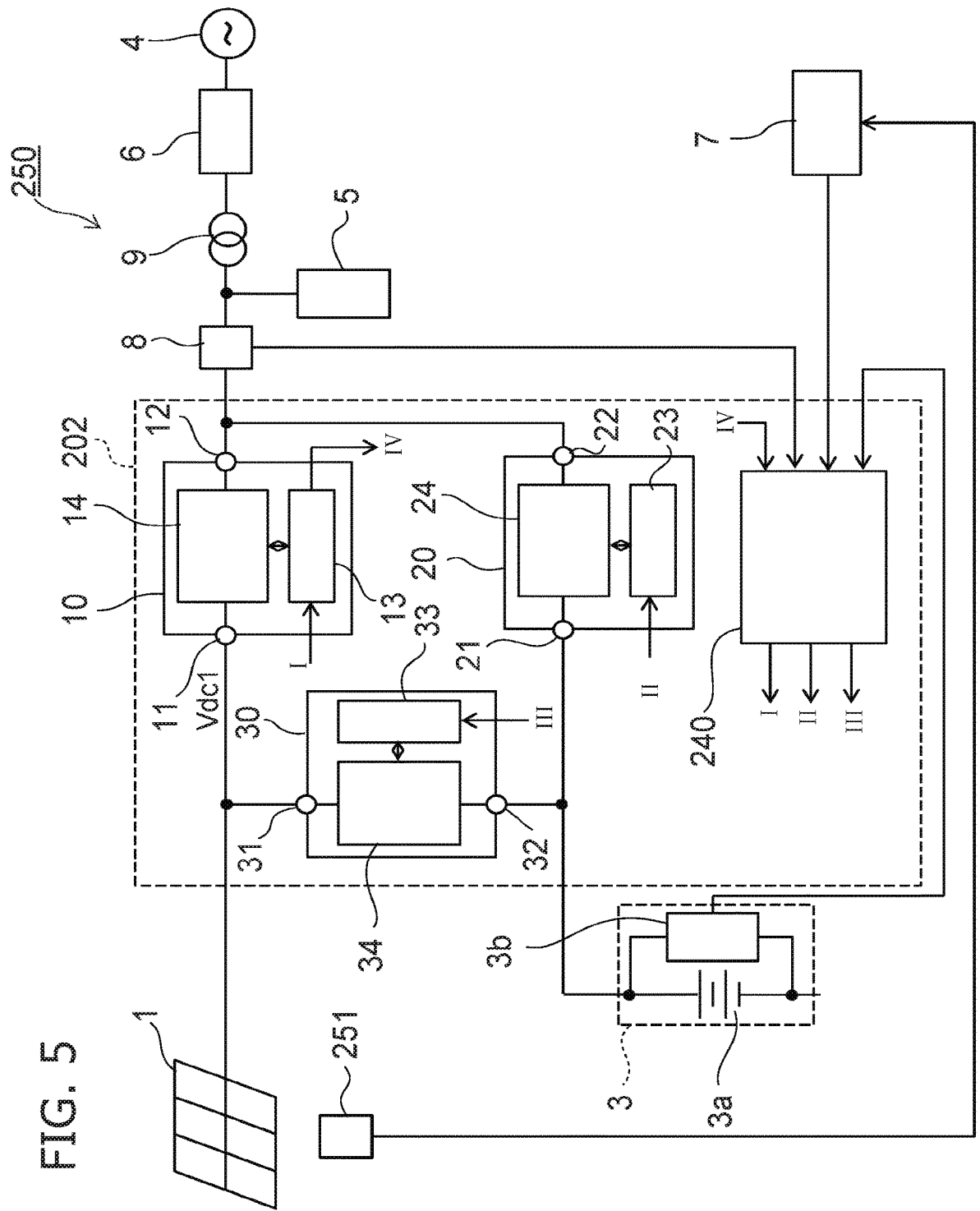
FIG. 5 is a block diagram illustrating a power supply system and a power conversion device according to a second embodiment.

FIG. 5 is a block diagram illustrating a power supply system and a power conversion device according to the embodiment.

In the case of the first embodiment described above, when the DC generator 1 outputs a sufficient generated power, the power supply system 50 supplies the power to the electric power system and charges the power storage device. In the embodiment, in the case where the output of the DC generator is not sufficient for reversing flow to the electric power system, the control device commands the third power conversion device to charge the power storage device. In the embodiment, when the output of the DC generator 1 is further lowered, the control device permits the second power conversion device to supply the power to the load.

A power supply system 250 and a power conversion system 202 of the embodiment are different from the case of the first embodiment in the configuration of a control device 240, and other configuration components are the same as the case of the first embodiment. The same configuration components are marked with like reference numerals, and detailed descriptions are omitted.

The power conversion system 202 of the embodiment includes the control device 240. The control device 240 acquires data Vdc1 of the voltage which the DC generator 1 outputs. The control device 240 has first threshold voltage data Vth1 to the data Vdc1 of the voltage. In the case where the acquired data Vdc1 of the voltage is lower than the first threshold voltage data Vth1, the control device 240 commands the third control part 33 so that the third power conversion device 30 charges the power storage device 3.

The control device 240 needs to acquire charge permission from the power storage device 3 in order to command the third power conversion device 30 to charge the power storage device 3 by the data Vdc1 of the voltage.

The control device 240 may transmit a command to stop the first power conversion device 10 to the first control part 13 when transmitting a charge command to the power storage device 3 to the third power conversion device 30.

The control device 240 has second threshold voltage data Vth2 to the data Vdc1 of the voltage. In the case where the acquired data Vdc1 of the voltage is lower than the second threshold voltage data Vth2, the control device 240 commands the third control part 33 to stop the operation of the third power conversion device 30. The control device 240 further commands the second control part 23 so that the second power conversion device 20 supplies the power to the load 5. In this case, what the power supply system 250 is disassembled from the electric power system 4 may be added to the condition.

In the case where the data Vdc1 of the voltage is not less than the first threshold voltage data Vth1, the power conversion system 202 operates as well as the case of the first embodiment.

In the power supply system 202 of the embodiment, like this example, a solar radiation meter 251 may be provided. The solar radiation meter 251 is provided in the case where the DC generator 1 is a solar cell panel. The solar radiation meter 251 measures a solar radiation intensity which the solar cell panel receives, and for example, transmits the data of the solar radiation intensity to the host controller 7. The data of the solar radiation intensity is measured, for example, at a predetermined time, and is transmitted to the host controller 7. Because the generated power of the solar cell panel changes depending on the solar radiation intensity, the power supply system 250 can recognize indirectly the magnitude of the generated power by using the data of the solar radiation intensity.

Figure 6:
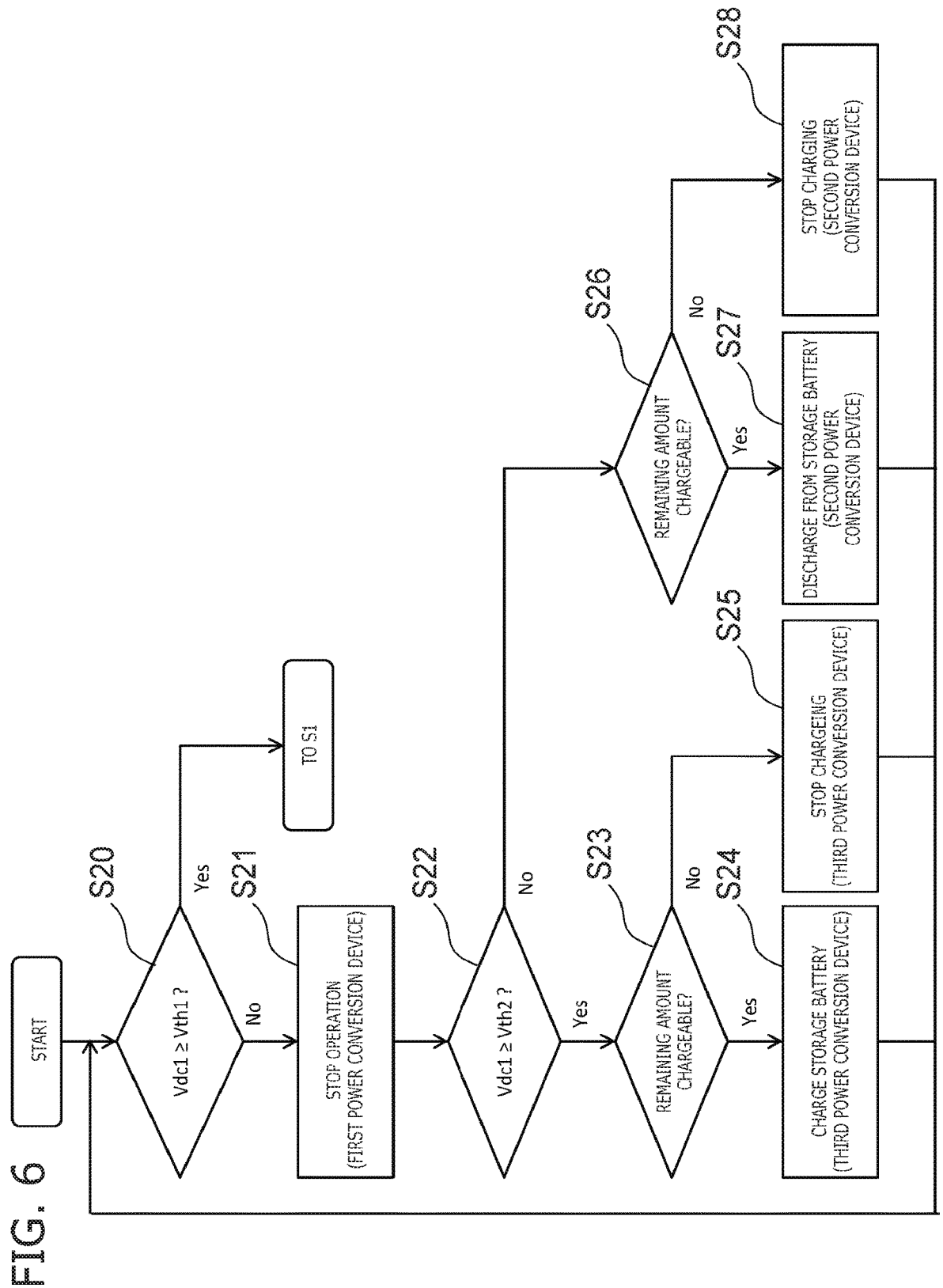
FIG. 6 is an example of a flow chart for describing an operation of the power conversion device of the second embodiment.

FIG. 6 is an example of a flow chart for describing the operation of the embodiment.

As shown in FIG. 6, in the step S20, the control device 240 compares the acquired data Vdc1 of the voltage which the DC generator 1 outputs with the first threshold voltage data Vth1. In the case where the data Vdc1 of the voltage is not less than the first threshold voltage data Vth1, the control device 240 transitions the processing to the step S1. In the case where the data Vdc1 of the voltage is lower than the first threshold voltage data Vth1, the control device 240 transitions the processing to the step S21.

In the step S21, the control device 240 commands the first control part 13 to stop the operation of the first power conversion device 10.

In the step S22, the control device 240 compares the data Vdc1 of the voltage with the second threshold voltage data Vth2. In the case where the data Vdc1 of the voltage is not less than the second threshold voltage data Vth2, the control device 240 transitions the processing to the step S23. In the case where the data Vdc1 of the voltage is lower than the second threshold voltage data Vth2, the control device 240 transitions the processing to the step S26.

In the step S23, the control device 240 determines whether the power storage device 3 has a chargeable remaining amount or not via the storage battery management part 3b. In the case where the remaining amount of the power storage device 3 is chargeable, the control device 240 transitions the processing to the step S24. In the case where the remaining amount of the power storage device 3 is at the level of charge stop, the control device 240 transitions the processing to the step S25.

In the step S24, the control device 240 commands the third control part 33 so that the third power conversion device 30 charges the power storage device 3.

In the step S25, the control device 240 commands the third control part 33 so that the third power conversion device 30 stops the charge operation.

In the steps S24, S25, the second power conversion device 20 may be in an operable state, however is desirably in a state in which the operation is stopped by the control device 240. Power consumption of the whole of the power conversion system 202 can be suppressed by stopping the second power conversion device 20 by the gate block or the like.

In the case where it is determined that the data Vdc1 of the voltage is lower than the second threshold voltage data Vth2 in the step S22, in the step S26, the control device 240 determined whether the power storage device 3 is chargeable or not via the storage battery management par 3b. In the case where the power storage device 3 has the chargeable remaining amount, the control device 240 transitions the processing to the step S27. In the case where the remaining amount of the power storage device 3 is at the level of charge stop, the control device 240 transitions the processing to the step S28.

In the step S27, the control device 240 commands the second control part 23 so that the second power conversion device 20 converts the DC power from the power storage device 3 to the AC power to supply to the load 5.

As a condition for the second power conversion device 20 to convert the discharge power from the power storage device 3 and output the AC power, the case where the power supply system 250 is disassembled from the electric power system 4 may be further added. In the case or the like where the electric power system 4 is blocked by an accident or the like, the power supply system 250 can supply a power to the load 5 by the second power conversion device 20.

In the step S28, the control device commands the second control part 23 to stop the operation of the second power conversion device 20.

In the steps S27, S28, the third power conversion device 30 may be either in an operable state or in a state in which the operation is stopped by the control device 240 from the point of view suppressing the power consumption of the whole system.

In the above description, with respect to the case where the generated power of the DC generator 1 is lowered and along with that the output voltage is lowered, the operations of the first power conversion device 10 to the third power conversion device 30 are defined. In the embodiment, in the case where the generated power of the DC generator 1 is smaller than a predetermined value, the power storage device 3 is charged and the discharge is possible from the power storage device 3. Therefore, if the lowering of the generated power can be detected directly or indirectly, other data can be used without limitation to the data Vdc1 of the DC voltage.

The generated power of the DC generator 1 changes depending on the solar radiation intensity in the case where the DC generator 1 is the solar cell panel, and thus the data of the solar radiation intensity output from the solar radiation meter 251 may be used in place of the voltage which the DC generator 1 outputs. By making the threshold value of the solar radiation intensity correspond to two threshold values Vth1, Vth2 described above, even in the case of small solar radiation in such a cloudy day, the power storage device 3 can be charged. The control device can detect that it is nighttime by the data of the solar radiation meter 251, and thus, for example, the second power conversion device 20 is operated at disassembling, and the power for back up of the load 5 can be supplied as well.

Effects of the power supply system and the power conversion system of the embodiment will be described.

In the power supply system 250 and the power conversion system 202 of the embodiment, the control device 240 detects lowering of the output of the DC generator 1, and the third power conversion device 30 is connected to the power storage device 3 without via the first power conversion device 10 and the second power conversion device 20. For that reason, the power storage device 3 can be charged directly by the third power conversion device 30, and thus the generated power of the DC generator 1 can be used more effectively.

In the power supply system 250 and the power conversion system 202 of the embodiment, the control device 240 detects further lowering of the output of the DC generator, and the second power conversion device 20 is directly connected to the power storage device 3 without via the first power conversion device 10. For that reason, the power charged in the power storage device 3 can be used effectively.

Generally, a cost per electricity energy which can be charged to the power storage device is often expensive compared with a cost per generated power of the solar cell panel. For that reason, the storage capacity of the DC generator 1 can be set to be smaller than the power generation amount of the solar cell panel, and thus capacity of the second power conversion device 20 and the third power conversion device 30 can be smaller than capacity of the first power conversion device 10. As described above, in the power supply system 250 and the power conversion system 202 of the embodiment, in the case where the output of the DC generator 1 is low, charge and discharge can be made directly by the second power conversion device 20 and the third power conversion device 30, and thus the generated power and the charged power can be used more effectively by the power supply system 250.

Third Embodiment

Figure 7:
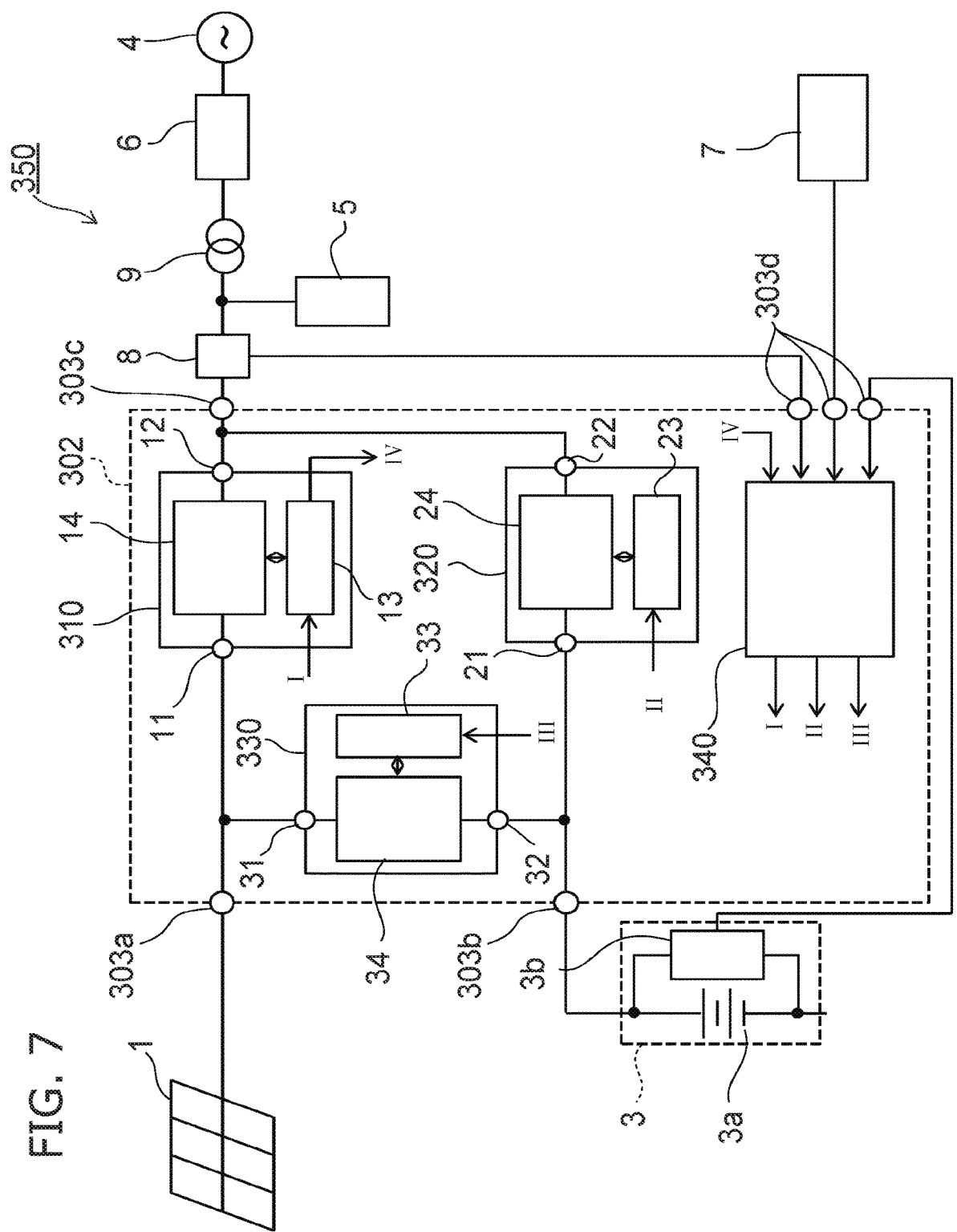
FIG. 7 is a block diagram illustrating a power conversion device according to a third embodiment.

FIG. 7 is a block diagram illustrating a power conversion device according to the embodiment.

In the case of the embodiment described above, the power conversion system includes multiple power conversion devices and control devices. Each of these devices may be configured as a functional block. That is, a power supply system 350 includes a single power conversion device.

As shown in FIG. 7, the power supply system 350 of the embodiment includes a power conversion device 302 and the DC generator 1 and the power storage device 3. The power conversion device 302 includes a first power conversion circuit 310, a second power conversion circuit 320, a third power conversion circuit 330, and a control circuit 340. The power conversion device 302 includes terminals 303a to 303d.

The power conversion device 302 is connected to the DC generator 1 via the terminal 303a. The power conversion device 302 is connected to the power storage device 3 via the terminal 303b. The power conversion device 302 is connected to the electric power system 4 and the load 5 via the terminal 303c. The power conversion device 302 is connected to an output power detection part 8, the host controller 7, and the power storage device 3 via the terminal 303d.

The first power conversion circuit 310 includes a first DC terminal 11, a first AC terminal 12, the first control part 13 and the first power conversion part 14. The first power conversion part 14 is connected to the terminal 303a via the first DC terminal 11. The first power conversion part 14 is connected to the terminal 303c via the first AC terminal 12.

The second power conversion circuit 320 includes a second DC terminal 21, a second AC terminal 22, the second control part 23, and the second power conversion part 24. The second power conversion circuit 320 is connected to the terminal 303b via the second DC terminal 21. The second power conversion circuit 320 is connected to the terminal 303c via the second AC terminal 22.

The third power conversion circuit 330 includes the third DC terminal 31, the fourth DC terminal 32, the third control part 33, and the third power conversion part 34. The third power conversion circuit 330 is connected to the terminal 303a via the third DC terminal 31. The third power conversion circuit 330 is connected to the terminal 303b via the fourth DC terminal 32.

The control circuit 340 is connected to the first control part 13, the second control part 23, and the third control part 33. The control circuit 340 is connected to the output power detection part 8, the host controller 7, and the power storage device 3 via the terminal 303d.

The first power conversion circuit 310, the second power conversion circuit 320, the third power conversion circuit 330, and the control circuit 340 correspond to the first power conversion device 10, the second power conversion device 20, the third power conversion device 30, and the control device 40 of other embodiments described above, respectively.

The power conversion device 302 of the embodiment is used for a smaller capacity power supply system, for example. For example, the power conversion system of the other embodiments described above is used for a large capacity power supply system of not less than a several 100 kW, so called mega-solar system or the like. On the contrary, the power conversion device of the embodiment may be used for a solar power system for home use or the like. The power conversion device or the power conversion system can be selected optionally irrespective of the circumstances described above.

Sharing of functions of each of the control circuit 340, the first control part 13, the second control part 23 and the third control part 33 is not limited to the above description. The control circuit 340 may include a portion or the whole of functions of each of the first control part 13, the second control part 23 and the third control part 33. For example, functions of the first control part 13 and the second control part 23 may be included in the first power conversion circuit 310 and the second power conversion circuit 320, respectively, as described above, and the function of the third control part 33 may be included in the control circuit 340. For example, a portion of the function of the third control part 33 may be included in the control circuit 340 or the like.

According to the embodiment, the power conversion system, the power supply system and the power conversion device which are possible of effectively using the generated power of the DC generator and the power charged in the power storage device can be provided.

Hereinabove, exemplary embodiments of the invention are described with reference to specific examples. However, the embodiments of the invention are not limited to these specific examples. For example, one skilled in the art may similarly practice the invention by appropriately selecting specific configurations of components of the first to third power conversion devices, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all power conversion systems, power supply systems, and power conversion devices practicable by an appropriate design modification by one skilled in the art based on the power conversion systems, the power supply systems, and the power conversion devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

The invention claimed is:

1. A power conversion system comprising:
a first power conversion device connected between a DC generator and an electric power system, the DC generator outputting a DC power, the first power conversion device converting at least a portion of the DC power to an AC power to supply to the electric power system;
a second power conversion device connected between a power storage device and the electric power system, the power storage device being possible to charge and discharge, the second power conversion device supplying a power from the power storage device to the electric power system, the second power conversion device supplying a power from the electric power system to the power storage device;
a third power conversion device connected between the DC generator and the power storage device, the third power conversion device supplying a power for charging the power storage device; and
a control device setting operations of the first power conversion device, the second power conversion device and the third power conversion device based on a first data and a second data, the first data being a data of the DC power, the second data being a data of a set DC power,
the control device, when the first data is larger than the second data or is equal to the second data,
transmitting a first command to the first power conversion device, the first command setting an AC power which the first power conversion device outputs based on the second data,
transmitting a second command to the third power conversion device, the second command setting a power which the third power conversion device charges the power storage device based on a difference between the first data and the second data,
when the first data is smaller than the second data,
transmitting a third command to the first power conversion device, the third command setting an AC power which the first power conversion device outputs based on the first data, transmitting a fourth command to the second power conversion device, the fourth command setting an AC power which the second power conversion device outputs based on a difference between the second data and the first data.

2. The power conversion system according to claim 1, wherein
the control device acquires a third data, the third data being a data of a remaining amount of a power of the power storage device,
when the third data is larger than a first threshold,
the control device transmits a fifth command to the third power conversion device, the fifth command stopping that the third power conversion device charges the power storage device.

3. The power conversion system according to claim 1, wherein
the control device acquires a third data, the third data being a data of a remaining amount of a power of the power storage device,
when the third data is smaller than a second threshold,
the control device transmits a sixth command to the second power conversion device, the sixth command stopping the second power conversion device to convert and output a power supplied from the power storage device.

4. The power conversion system according to claim 1, wherein
when the first data is smaller than a third threshold having a smaller value than the second data,
the control device transmits a seventh command to the first power conversion device, the seventh command stopping an operation of the first power conversion device, and
transmits an eighth command to the third power conversion device, the eighth command setting a power which the third power conversion device charges the power storage device based on the first data.

5. The power conversion system according to claim 1, wherein
when the first data is smaller than a fourth threshold having a smaller value than the third data,
the control device transmits a ninth command to the second power conversion device, the ninth command allowing the second power conversion device to convert and output a power supplied from the power storage device.

6. The power conversion system according to claim 5, further comprising:
a load device connected between the second power conversion device and the electric power system, the load device consuming an AC power,
the second power conversion device supplying a power to the load device after being disassembled from the electric power system.

7. A power supply system comprising:
a DC generator outputting an AC power;
a power storage device being possible to charge and discharge;
a first power conversion device connected between the DC generator and an electric power system, the first power conversion device converting at least a portion of the DC power to an AC power and supplying to the electric power system;
a second power conversion device connected between the power storage device and the electric power system, the second power conversion device supplying a power from the power storage device to the electric power system, and supplying a power from the electric power system to the power storage device;
a third power conversion device connected between the DC generator and the power storage device, the third power conversion device supplying a power for charging the power storage device; and
a control device setting operations of the first to third power conversion devices based on a first data and a second data, the first data being a data of the DC power, the second data being a data of a set DC power,
the control device, when the first data is larger than the second data or is equal to the second data,
transmitting a first command to the first power conversion device, the first command setting an AC power which the first power conversion device outputs based on the second data,
transmitting a second command to the third power conversion device, the second command setting a power which the third power conversion device charges the power storage device based on a difference between the first data and the second data,
when the first data is smaller than the second data,
transmitting a third command to the first power conversion device, the third command setting an AC power which the first power conversion device outputs based on the first data,
transmitting a fourth command to the second power conversion device, the fourth command setting an AC power which the second power conversion device outputs based on a difference between the second data and the first data.

8. A power conversion device comprising:
a first power conversion part connected between a DC generator outputting a DC power and an electric power system, the first power conversion part converting at least a portion of the DC power to an AC power and supplying to the electric power system;
a second power conversion part connected between a power storage device being possible to charge and discharge and the electric power system, the second power conversion part supplying a power from the power storage device to the electric power system, and supplying a power from the electric power system to the power storage device;
a third power conversion part connected between the DC generator and the power storage device, the third power conversion part supplying a power for charging the power storage device; and
a control part setting operations of the first to third power conversion parts based on a first data and a second data, the first data being a data of the DC power, the second data being a data of a set DC power,
the control part, when the first data is larger than the second data or is equal to the second data,
transmitting a first command to the first power conversion part, the first command setting an AC power which the first power conversion part outputs based on the second data,
transmitting a second command to the third power conversion part, the second command setting a power which the third power conversion part charges the power storage device based on a difference between the first data and the second data,
when the first data is smaller than the second data, transmitting a third command to the first power conversion part, the third command setting an AC power which the first power conversion part outputs, transmitting a fourth command to the second power conversion part, the fourth command setting an AC power which the second power conversion part outputs based on a difference between the second data and the first data.

\* \* \* \* \*